(12) United States Patent
Fielding et al.

(10) Patent No.: US 10,733,785 B2
(45) Date of Patent: Aug. 4, 2020

(54) GRAPHICS PROCESSING

(71) Applicant: Arm Limited, Cambridge (GB)

(72) Inventors: Edvard Fielding, Trondheim (NO);
Carmelo Giliberto, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/129,546

(22) Filed: Sep. 12, 2018

(65) Prior Publication Data
US 2019/0080504 A1   Mar. 14, 2019

(30) Foreign Application Priority Data

Sep. 13, 2017 (GB) .................................. 1714752.1

(51) Int. Cl.
| *G06T 15/04* | (2011.01) |
| *G06T 1/60* | (2006.01) |
| *G06T 15/00* | (2011.01) |
| *G06T 1/20* | (2006.01) |
| *G06T 15/80* | (2011.01) |

(52) U.S. Cl.
CPC ............... *G06T 15/04* (2013.01); *G06T 1/20* (2013.01); *G06T 1/60* (2013.01); *G06T 15/005* (2013.01); *G06T 15/80* (2013.01)

(58) Field of Classification Search
CPC .. G06T 15/04; G06T 1/20; G06T 1/60; G06T 15/005; G06T 15/80; G06T 11/40
See application file for complete search history.

(56) References Cited

U.S. PATENT DOCUMENTS

| 6,181,347 | B1 | 1/2001 | Devic et al. |
| 6,184,894 | B1 | 2/2001 | Rosman et al. |
| 7,593,018 | B1 | 9/2009 | Toksvig et al. |
| 2011/0292048 | A1 | 12/2011 | Chien et al. |
| 2015/0130818 | A1 | 5/2015 | Peng et al. |

FOREIGN PATENT DOCUMENTS

| EP | 0775981 A2 | 5/1997 |
| EP | 3129973 A1 | 2/2017 |

OTHER PUBLICATIONS

Combined Search and Examination Report dated Mar. 13, 2018 for GB Application No. GB1714752.1.

*Primary Examiner* — Antonio A Caschera
(74) *Attorney, Agent, or Firm* — EIP US LLP (57) ABSTRACT

A graphics processing system comprising storage for storing texture data representative of a plurality of texels in a texture space and a graphics processor coupled to the storage. The graphics processor comprises a texture mapping unit operable to receive request data to request the calculation of a value at a position in the texture space using an interpolation process, the request data comprising weight data representative of weights for input to the interpolation process, and process the weight data with the texture data to perform the interpolation process, thereby calculating the value at the position in the texture space.

20 Claims, 6 Drawing Sheets

GRAPHICS PROCESSING

CROSS-REFERENCE TO RELATED APPLICATIONS

This application claims priority to GB Application No. GB 1714752.1, filed 13 Sep. 2017, under 35 U.S.C. § 119(a). The above-referenced patent application is incorporated by reference in its entirety.

BACKGROUND OF THE INVENTION

Technical Field

The present invention relates to systems and methods for graphics processing.

Background

A known graphics processing pipeline involves a texture mapping procedure in which a texture, which is typically two dimensional, is applied or mapped onto the surface of a shape or polygon, which is for example three dimensional, before being rendered by a computer graphics system. This generally allows more realistic or detailed images to be rendered. For example, detail on an object may be generated by applying a texture to a set of graphics primitives, such as polygons, representing the object, to give the object the appearance of the texture.

Typically, the resolution of the texture is different from the resolution of the pixels of a display device for displaying the rendered image. For example, a size of texture elements, sometimes referred to as texels (which may represent features or characteristics of the texture, such as a color or luminance value) may differ from a pixel size. Thus, there may not be a one-to-one mapping between a pixel and a texel. For example, one pixel may correspond to multiple texels or vice versa.

To compensate for this, the texture mapping procedure may involve texture filtering to determine a value, for example a texture value, for a position that corresponds to a pixel. This position may, however, not directly correspond to a texel in a given texture space. For example, the position may be between two neighboring texels (for example if a pixel is smaller than a texel or is misaligned with a texel) or the position may cover an area including multiple texels (if a pixel is larger than a texel). Texture filtering may thus involve interpolating texels that surround the position in the texture space to determine the value at that position. For example, if a pixel is smaller than a texel, the texture filtering may involve texture minification. Conversely, if a pixel is larger than a texel, the texture filtering may involve texture magnification.

Such a texture filtering process may involve performing a weighted sum of texel values. For example, a texture minification process (sometimes referred to as downscaling), may involve multiplying each texel surrounding a position at which a value is to be calculated with a weight with a value of between 0 and 1 and then summing the weighted texels to calculate the value at the position.

It is desirable to provide systems and methods for graphics processing, for example for texture mapping, that are more efficient or flexible than known systems and methods.

BRIEF DESCRIPTION OF THE DRAWINGS

Further features will become apparent from the following description, given by way of example only, which is made with reference to the accompanying drawings.

DETAILED DESCRIPTION

Details of the systems and methods according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein provide a graphics processing system including storage for storing texture data representative of a plurality of texels in a texture space and a graphics processor coupled to the storage. The graphics processor includes a texture mapping unit operable to receive request data to request the calculation of a value at a position in the texture space using an interpolation process, the request data including weight data representative of weights for input to the interpolation process. The texture mapping unit is further operable to process the weight data with the texture data to perform the interpolation process, thereby calculating the value at the position in the texture space.

By passing the weight data to the texture mapping unit with the request data, the weight data can be pre-calculated rather than calculated by the texture mapping unit itself. This provides more flexibility as different weights, for example to implement different interpolation algorithms, can be passed to the texture mapping unit straightforwardly, without having to reconfigure the texture mapping unit. Thus the texture mapping unit can be used to perform a variety of different interpolation algorithms, without needing to include different hardware support for each of the different algorithms. This can therefore reduce the area overhead to implement the texture mapping unit in hardware compared to a texture mapping unit that includes dedicated hardware support for a variety of different interpolation algorithms, for computing the weights internally to the unit.

Providing the weight data to the texture mapping unit may also improve the efficiency of the graphics processing system by reducing the amount of data transferred between various components of the graphics processing system, such as between a texture mapping unit of a graphics processor and a programmable shader core of the graphics processor, which may for example be considered to correspond to a shader processing unit. For example, fetching each of a plurality of texels from storage of the texture mapping unit to the shader core for processing in order to calculate weights and perform the interpolation typically involves a fetch operation for each of the texels. This is generally less efficient than the systems and methods described herein in which, for example, a single fetch is performed to transfer pre-calculated weights to the texture mapping unit, which can itself perform the interpolation process.

To put the systems and methods according to examples into context, a graphics processing system 100 and a graphics processing pipeline 200 for use with these systems and methods will first be described with reference to FIGS. 1 and 2.

Figure 1:
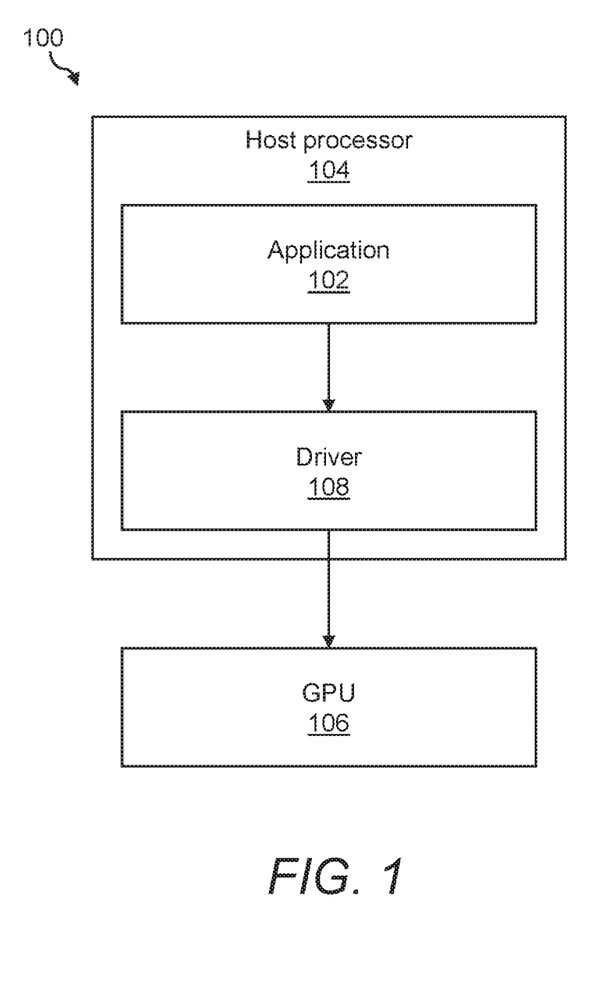
FIG. 1 shows schematically an example of a graphics processing system according to examples.

FIG. 1 shows schematically an example of a graphics processing system 100. In the graphics processing system 100 of FIG. 1, an application 102, such as a game, executing on a host processor 104, which is for example a central processing unit (CPU), requests graphics processing operations to be performed by an associated graphics processor, which in this example is a graphics processing unit (GPU) 106. To do this, the application 102 generates application programming interface (API) calls that are interpreted by a programming interface, which in this example is a driver 108 for the GPU 106. The driver 108 runs on the host processor 104. The driver 108 generates appropriate commands to the GPU 106 to generate the graphics output requested by the application 102. A set of commands is provided to the GPU 106 in response to the commands from the application 102. The commands may be to generate a frame to be displayed on a display device coupled to or in communication with the host processor 104 and/or the GPU 106.

Figure 2:
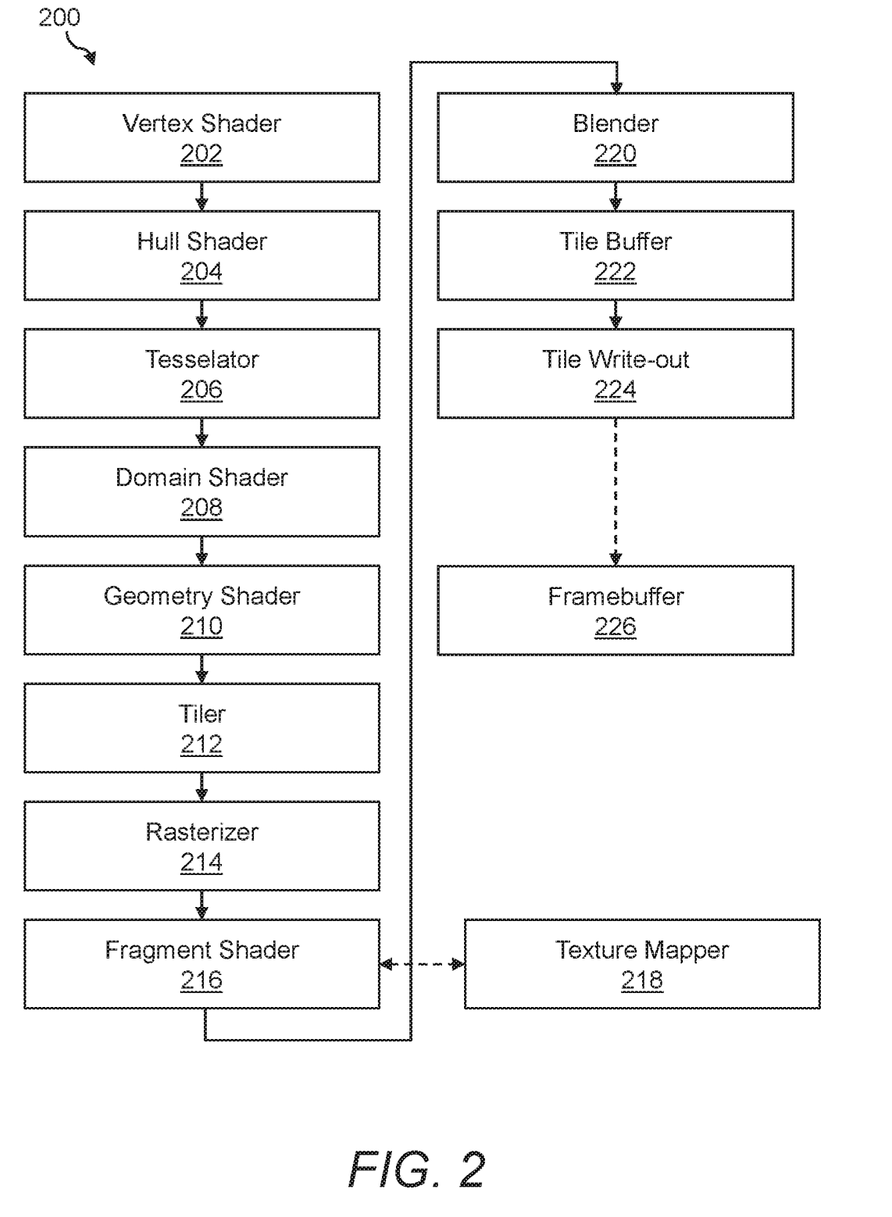
FIG. 2 shows schematically an example of a graphics processing pipeline according to examples.

FIG. 2 shows schematically an example of a graphics processing pipeline 200. The graphics processing pipeline 200 indicates a sequence of actions that may be performed by a graphics processor such as a GPU.

In this example, the GPU is a tile-based renderer. The GPU therefore produces tiles of a render output data array to be generated. The render output data array may be an output frame. Tile-based rendering differs from immediate mode rendering in that, rather than the entire render output being processed in one go, the render output is divided into a plurality of smaller sub-regions (or 'areas'). Those sub-regions are referred to herein as tiles. Each tile is rendered separately. For example, each tile may be rendered one after another. The rendered tiles are then recombined to provide the complete render output for display. In tile-based rendering, the render output may be divided into regularly sized and shaped tiles. The tiles may be square or another shape.

Other terms that may be used for "tiling" and "tile-based" rendering include "chunking", where the rendering tiles are referred to as "chunks", and "bucket" rendering. The terms "tile" and "tiling" will be used hereinafter for convenience, but it should be understood that these terms are intended to encompass all alternative and equivalent terms and techniques.

The render output data array may be an output frame intended for display on a display device, such as a screen or printer. The render output may also, for example, comprise intermediate data intended for use in later rendering passes. An example of this is a "render to texture" output.

When a computer graphics image is to be displayed, it may first be defined as a set of geometries, for example as a series of primitives. An example of a primitive is a polygon. The geometries are then divided into graphics fragments in a rasterization process. This is followed by graphics rendering. During a graphics rendering operation, the renderer may modify data associated with each fragment so that the fragments can be displayed correctly. Examples of such data include the color and transparency. Once the fragments have fully traversed the renderer, then their associated data values are stored in memory, ready for output.

FIG. 2 shows various elements and pipeline stages associated with a graphics processing pipeline 200 according to examples. There may however be other elements and stages of the graphics processing pipeline that are not illustrated in FIG. 2.

As shown in FIG. 2, the graphics processing pipeline 200 includes a number of stages, including a vertex shader 202, a hull shader 204, a tesselator 206, a domain shader 208, a geometry shader 210, a tiler 212, a rasterization stage 214, a fragment shading stage 216, a texture mapping stage 218, a blending stage 220, a tile buffer 222 and a downsampling and writeout stage 224. Other arrangements for a graphics processing pipeline are however possible.

The vertex shader 202 receives input data values associated with the vertices defined for the output to be generated. The vertex shader 202 processes those data values to generate a set of corresponding, vertex-shaded, output data values for use by subsequent stages of the graphics processing pipeline 200.

Each primitive to be processed may be defined and represented by a set of vertices. Each vertex for a primitive may have associated with it a set of attributes. A set of attributes is a set of data values for the vertex. These attributes may include location data and other, non-location data (or 'varyings'). The non-location data may represent, for example, color, light, normal and/or texture coordinates for the vertex in question.

A set of vertices is defined for a given output to be generated by the graphics processing pipeline. The primitives to be processed for the output include given vertices in the set of vertices. The vertex shading operation transforms the attributes for each vertex into a desired form for subsequent graphics processing operations. This may include, for example, transforming vertex location attributes from the world or user space for which they are initially defined to the screen space in which the output of the graphics processing system is to be displayed. This may also include, for example, modifying the input data to take account of the effect of lighting in the image to be rendered.

The hull shader 204 performs operations on sets of patch control points and generates additional data known as patch constants.

The tessellation stage 206 subdivides geometry to create higher-order representations of the hull.

The domain shader 208 performs operations on vertices output by the tessellation stage, in a similar manner to the vertex shader 202.

The geometry shader 210 processes entire primitives such as a triangles, points or lines.

The vertex shader 202, hull shader 204, tesselator 206, domain shader 208 and geometry shader 210 perform the geometry operations, such as transformation and lighting operations, and primitive setup, to setup the primitives to be rendered, in response to commands and vertex data provided to the graphics processing pipeline 200.

Once all the primitives to be rendered have been appropriately set up, the tiler 212 then determines which primitives are to be processed for each tile that the render output has been divided into for processing purposes. To do this, the tiler 212 compares the location of each primitive to be processed with the tile locations, and adds the primitive to a respective primitive list for each tile that it determines the primitive could potentially fall within. Any suitable and desired technique for sorting and binning primitives into tile lists, such as exact binning, or bounding box binning or anything in between, can be used for the tiling process.

Once lists of primitives to be rendered (or 'primitive lists') have been prepared for each rendering tile in this way, the primitive lists are stored for use. The primitive lists allow the system to identify which primitives are to be considered and rendered when the tile in question is rendered.

Once the tiler 212 has prepared all of the tile lists, then each tile can be rendered. To do this, each tile is processed by the graphics processing pipeline stages that follow the tiler 212.

When a given tile is being processed, each primitive that is to be processed for that tile is passed to the rasterizer 214. The rasterizer 214 of the graphics processing pipeline 200 operates to rasterize the primitives into individual graphics fragments for processing. To do this, the rasterizer 214 rasterizes the primitives to sampling points and generates graphics fragments having appropriate locations for rendering the primitives. The fragments generated by the rasterizer 214 are then sent onwards to the rest of the graphics processing pipeline 200 for processing.

In examples, a Z (or 'depth') test may be performed on fragments received from the rasterizer 214 to see if any fragments can be discarded (or 'culled') at this stage (not shown in FIG. 2). To do this, an early Z and stencil test stage may compare the depth values of fragments issued by the rasterizer 214 with the depth values of fragments that have already been rendered. The depth values of fragments that have already been rendered may be stored in a depth buffer that is part of a tile buffer 222 (described further below). The comparison performed by the early Z and stencil test stage is to determine whether or not the new fragments will be occluded by fragments that have already been rendered. At the same time, an early stencil test may be carried out, in which a stencil value of a fragment is compared against a value in a stencil buffer. If the test is failed, the fragment may be culled. In other examples, though, the early Z and stencil test stage may be omitted.

The fragment shading stage 216 performs the appropriate fragment processing operations on fragments it receives from the rasterizer 214 to generate the appropriate rendered fragment data. This fragment processing may include any suitable fragment shading processes, such as executing fragment shader programs on the fragments to generate the appropriate fragment data, applying textures to the fragments, applying fogging or other operations to the fragments, etc. The fragment shading stage 216 may be a programmable fragment shader.

In the example of FIG. 2, the fragment shader 216 passes the fragments to a texture mapper 218, which applies a texture to the fragments. The textured fragments are then passed back to the fragment shader 216.

As can be seen from FIG. 2, the graphics processing pipeline 200 includes a number of programmable processing or "shader" stages, namely the vertex shader 202, the hull shader 204, the domain shader 208, the geometry shader 210, and the fragment shader 216 (which in this example includes the texture mapper 218 stage). These programmable shader stages execute respective shader programs that have one or more input variables and generate sets of output variables. The shader program in question may be executed for each work item to be processed, for example for each vertex in the case of the vertex shader 202. An execution thread may be issued for each work item to be processed, and the thread then executes the instructions in the shader program to produce the desired, shaded, output data.

After the fragment shader 216, there may then be a late fragment Z and stencil test stage (not illustrated in FIG. 2), which carries out, amongst other things, an end of pipeline depth test on the shaded fragments to determine whether a rendered fragment will actually be seen in the final image. This depth test typically uses a Z-buffer value for the position of the fragment that is stored in the Z-buffer in the tile buffer 222 to determine whether the fragment data for the new fragments should replace the fragment data of the fragments that have already been rendered. This may involve comparing the depth values of the fragments issued by the fragment shader 216 with the depth values of fragments that have already been rendered, as stored in the Z-buffer. This late fragment depth and stencil test stage may also carry out late alpha and/or stencil tests on the fragments.

The textured fragments outputted from the texture mapper 218 may then be subjected, in the blender 220, to any blending operations with fragments that are already stored in the tile buffer 222. Any other remaining operations necessary on the fragments, such as dither, etc. (not shown) may also be carried out at this stage.

Finally, the output fragment data (or 'values') are written to the tile buffer 222. The depth value for an output fragment is also written appropriately to a buffer within the tile buffer 222. The tile buffer 222 stores color and depth buffers that store an appropriate color, etc., or depth, respectively, for each sampling point that the buffers represent. These buffers store an array of fragment data that represents part, in this example a tile, of the overall render output with respective sets of sample values in the buffers corresponding to respective pixels of the overall render output. For example, each 2×2 set of sample values may correspond to an output pixel, where 4× multisampling is used.

The tile buffer 222 may be provided as part of random access memory (RAM) that is local to the graphics processing pipeline 200. In other words, the tile buffer 222 may be provided in on-chip memory.

The data from the tile buffer 222 is input to a downsampling write out-unit 224, and then output (or 'written back') to an external memory output buffer, such as a framebuffer 226 of a display device (not shown). The display device could include, for example, a display including an array of pixels, such as a computer monitor or a printer.

The downsampling and writeout unit 224 downsamples the fragment data stored in the tile buffer 222 to the appropriate resolution for the output buffer and device, such that an array of pixel data corresponding to the pixels of the output device is generated. This results in output values in the form of pixels for output to the output framebuffer 226.

Once a tile of the render output has been processed and its data exported to a main memory for storage, for example to the frame buffer 226 in a main memory, the next tile is then processed, and so on, until sufficient tiles have been processed to generate the entire render output. The process is then repeated for the next render output and so on.

Figure 3:
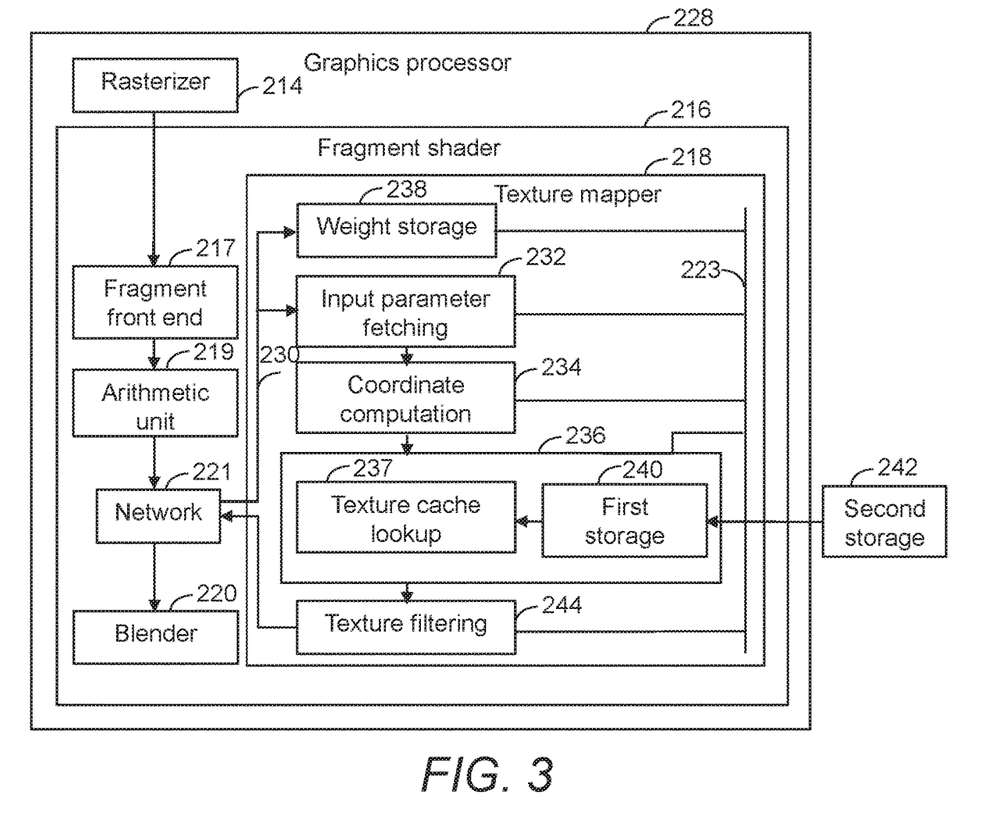
FIG. 3 shows schematically an example of components of a graphics processor according to examples.

FIG. 3 shows schematically an example of part of a graphics processing system for implementing the graphics processing pipeline 200 of FIG. 2. In the example of FIG. 3, a graphics processor 228 is configured to implement the rasterizer 214, the fragment shader 216, the texture mapper 218 (which may be referred to interchangeably as a texture mapping unit 218) and the blender 220. These modules may be implemented in hardware of the graphics processor 228, in software or a combination of hardware or software. For example, the graphics processor 228 may be instructed to implement these modules via graphics computer program code, which may be received by the graphics processor 228 via a suitable programming interface. This is described in further detail below with reference to FIG. 5. The graphics processor 228 may be any appropriately programmed or configured graphics processor 228 such as the ARM Mali-G51 GPU, available from ARM Limited, 110 Fulbourn Road, Cambridge, CB1 9NJ, United Kingdom.

Graphics fragments generated by the rasterizer 214 are received by a fragment front end 217 of the fragment shader 216. The fragment shader 217 sends request data 230 to the texture mapping unit 218. In examples such as FIG. 3, the graphics processor 228 includes a shader processing unit (sometimes referred to as a shader core) for processing or implementing the instructions corresponding to the fragment shader 217 stage. In such cases, the shader processing unit may be configured to transmit the request data 230 to the texture mapping unit 218 to instruct the texture mapping unit 218 to perform the interpolation process.

The request data 230 for example includes weight data representative of weights for input to an interpolation process. The weight data is for example calculated by an arithmetic unit 219 of the fragment shader 216. Calculation of the weight data is described further below. The request data 230 may be considered to correspond to a texturing request message to instruct the texture mapping unit 218 to calculate a value at a position in a texture space using the interpolation process. The request data 230 is then passed to the texture mapper 218 for example via a network 221. The weight data of the request data 230 is for example written into weight storage 238 of the graphics processor 228 when the request data 230 is received by the texture mapper 218. In the example of FIG. 3, the texture mapper 218 includes the weight storage 238, although in other examples the weight storage 238 may be located differently within the graphics processor 228.

The weight storage 238 may be considered to be a local storage of the graphics processor 228. For example, the weight storage 238 may include at least one of an on-chip memory or buffer of the graphics processor 228. The weight storage 238 may, however, be any suitable local memory of or accessible to the graphics processor. For example, the weight storage 238 may be or include a Random Access Memory (RAM) of the graphics processor 228 or an embedded Dynamic Random Access Memory (eDRAM), which may be integrated on the same chip as other components of the graphics processor 228.

The weight storage 238 in the example of FIG. 3 includes a so-called "weights buffer" for storing the weight data received as part of the request data 230. The weights buffer may be considered to be storage or memory for storing the weight data temporarily. The weights buffer is for example a Random Access Memory (RAM). As the weights buffer of the weight storage 238 in FIG. 3 is included in the texture mapper 218 rather than in an external location such as a main or system memory, the weight data may be retrieved more rapidly from the weights buffer (and hence from the weight storage 238) than from the main memory.

The texture mapping unit 218 in the example of FIG. 3 responds with a texturing response message, which for example includes a value representative of a filtered sample at the position in the texture space, which is interpolated from the texture data using the weight data. For example, the filtered sample may be a filtered color in examples in which the texture represents a color distribution in the texture space. The texture mapping unit 218 may be a co-processor to the fragment shader 216, which may correspond to a graphics processor shader core. Alternatively, the texture mapping unit 238 may be a co-processor to a central processor of a computer device including the graphics processor 228.

In addition to including the weight data, the request data 230 may also include position data representative of the position in the texture space at which the value is to be interpolated. For example, the position data may represent coordinates of the position in the texture space or coordinates at which the texture is to be sampled. The position data may also be stored in the first storage 238, for example in the weights buffer or in a separate or different buffer or cache.

The texture mapping unit 218 in this example begins by looking up a texture descriptor and a sampler descriptor using an input parameter fetching unit 232. The texture descriptor and the sampler descriptor may for example be fetched from other storage accessible to or included within the graphics processor 228 (not illustrated separately in FIG. 4). For example, there may be a texture descriptor cache for storing the texture descriptor and a sampler descriptor cache for storing the sampler descriptor. The texture descriptor typically includes information related to characteristics of the texture itself, such as texture size (in texels), dimensionality (such as one, two or three dimensions), or texel format. The sampler descriptor for example includes information relating to parameters or characteristics of the interpolation process. Such characteristics may include a texture filtering mode, a coordinate wrap mode, which for example indicates how edges of the texture are to be handled, or a LOD (level of detail) computation parameter.

Processing then continues in the coordinate computation unit 234 of the texture mapping unit 218. In this example, the request data includes position data and the coordinate computation unit 234 converts the position data into an appropriate format for accessing the texture data for the interpolation from storage. For example, where the position data is in a floating-point format, and is representative of coordinates in the texture space, the position data may be converted by the coordinate computation unit 234 to a texel index. However, the position may not directly correspond to a texel in the texture space. For example, if a first texel, with index 0, is located at coordinates (0, 0), a second texel, with index 1, is located at coordinates (1, 0), a third texel, with index 2, is located at coordinates (0, 1), a fourth texel, with index 3, is located at coordinates (1, 1) and the position data represents coordinates (0.5, 0.5), the position data corresponds to a location between the first, second, third and fourth texels. Thus, it may not be possible to identify an integer texel index for the position data. In such cases, though, the coordinate computation unit 234 may be used to calculate the texel indices for a plurality of texels that correspond to an area in the texture space that includes the position. The number of texels in the plurality of texels for example depends on at least one of the parameters obtained by the input parameter fetching unit 232. In this simple example, illustrated further in FIG. 4, the number of texels in the plurality of texels is four, although other numbers are possible in other examples. The coordinate computation unit 234 may therefore be used to identify texel indices for the four texels with the coordinates (0, 0), (1, 0), (0, 1) and (1, 1), which span the area that includes the position (0.5, 0.5). The texel indices may subsequently be used for computing the memory addresses of the texture data representative of the plurality of texels.

In the example of FIG. 3, a data fetching unit 236 is used to read the texture data. In this example, the data fetching unit 236 includes a texture cache lookup unit 237 that reads the texture data from first storage 240 of the texture mapping unit 218, which in the example of FIG. 3 forms part of the data fetching unit 236. As will be appreciated, in other examples, though, the first storage 240 may be located within a different component or unit of the texture mapper 218 or of the graphics processor 228. The first storage 240 may be a cache, such as a so-called "texture cache" for storing the texture data. A cache may be considered to be storage or memory for storing data to enable more rapid retrieval of the data in the future. For example, a cache may store a duplicate of data that is also stored in a main memory but may be a smaller or faster memory, located closer to a processor, than the main memory. Thus, it may take less time to access data from the cache than from the main memory. The first storage 240 maybe a RAM or an eDRAM and may be considered to be on-chip memory of the graphics processor 228. The first storage 238 is typically accessible by components of the texture mapper as indicated by the line 223 in FIG. 3. The first storage 240 may include a plurality of storage components such as a plurality of caches of the graphics processor 228. While in some cases (such as the example of FIG. 3), the first storage 240 may be dedicated to the graphics processor 228, in other cases, the first storage 240 may be part of storage that is shared with other processors. For example, the first storage 240 may form part of a main system RAM that is also accessible to a host central processor or central processing unit (CPU). In such cases, the first storage 240 may be considered to be the part of shared storage that is accessible or visible to the graphics processor 228. The texture cache lookup unit 237 typically locates the texture data in the first storage 240 based on the memory addresses calculated using the coordinate computation unit 234.

The graphics processing system of FIG. 3 also includes second storage 242, which in this example is external to the graphics processor 228. For example, the second storage 242 may be system storage, for example primary storage, or a main memory of a host system running the graphics processing system. The second storage 242 may be or include at least one of volatile memory, such as a Random Access Memory (RAM), for example Static RAM (SRAM) or Dynamic RAM (DRAM) and non-volatile memory, such as Read Only Memory (ROM) or a solid state drive (SSD) such as Flash memory. The second storage 242 in examples may include further storage devices, for example magnetic, optical or tape media, compact disc (CD), digital versatile disc (DVD) or other data storage media. The second storage 242 may be removable or non-removable from the graphics processing system.

In the example of FIG. 3, the data fetching unit 236 is also operable to identify, from the position data, the plurality of texels corresponding to the area in the texture space including the position and determine that a portion of the texture data representative of at least one of the plurality of texels is absent from the first storage 240. In other words, there may be a cache miss, where there is a failed attempt to read the entirety of the texture data from the first storage 240, for example from the texture cache of the first storage 240. For example, there may be a cache miss by the texture cache lookup unit 237 of the data fetching unit 236. If the data fetching unit 236 determines that the portion of the texture data is not present in the first storage 240, the data fetching unit 236 fetches the portion of the texture data from the second storage 242 and stores the portion of the texture data in the first storage 240. In the example of FIG. 3, a main memory lookup unit (not shown separately in FIG. 3) of the data fetching unit 236 fetches the portion of the texture data from the second storage 242.

In some examples, the request data is first request data, the value is a first value, the position is a first position, the weight data is a first weight data, the weights are first weights, the texture data is first texture data and the plurality of texels is a first plurality of texels. In these examples, the texture mapping unit 218 may be operable to, while the portion of the first texture data is being fetched from the second storage 242, receive second request data to request the calculation of a second value at a second position in the texture space using the interpolation process, the second request data including second weight data representative of second weights for input to the interpolation process, process the second weight data with the second texture data to perform the interpolation process, thereby calculating the second value at the second position in the texture space, and, after the portion of the first texture data is stored in the first storage 240, process the first weight data with the first texture data to perform the interpolation process, thereby calculating the first value at the first position in the texture space.

In other words, if the first request data processed by the texture mapping unit 218 triggers a cache miss (for example if the first texture data is not present in the first storage 240), the texture mapping unit 218 can process further texturing messages, such as the second request data. For example, the texture cache lookup unit 237 can fetch the second texture data from the first storage 240 (for example from the texture cache). In such cases, the first request data may be stored in third storage of the graphics processor 228 (not illustrated in FIG. 3). For example, the first request data may be stored in a buffer such as a parking buffer, which may be considered to be storage or memory for storing pending memory access requests, while requested data is being moved from one location to another, such as from one storage to another. The parking buffer may form part of the weight storage 238 or may be a further or separate buffer. Once the missing portion of the first texture data is retrieved from the second storage 242, which is for example a system or main memory, the state of the corresponding cache lines may be changed to VALID. Upon determining this, the first request data may be transferred from the buffer to a texture filtering unit 244 for further processing.

The texture filtering unit 244 performs the interpolation process by processing the weight data with the texture data. The texture filtering unit 244 for example reads the weight data from the weight storage 238 (e.g. from the weights buffer) and reads the texture data from the first storage 240 (e.g. the texture cache). The various components of the texture mapper are typically interconnected as indicated by the line 223 in FIG. 3. This allows data to be transferred between the various components, for example the weight data may be transferred from the weight storage 238 and the texture data may be transferred from the first storage 240 to the texture filtering unit 244. In the example of FIG. 3, the weights used for the interpolation process are computed externally to the texture mapping unit 218 rather than being calculated by the texture mapping unit 218 itself. In this case, the weights (represented by the weight data) are instead provided in the texturing request message (represented by the request data, which includes the weight data). The weight data may be stored in storage of the graphics processor 228 while the texture data are fetched, such as the weights storage 238 described above, which may be or include a weights buffer. The weights buffer may be a pre-existing buffer of the graphics processor 228, such as the shadow reference mapping buffer. Thus, the methods described herein may be implemented by altering the configuration of pre-existing graphics processors, for example using graphics computer program code associated with a programming interface for the graphics processor, without having to alter the underlying hardware of the graphics processor. In other examples, though, the hardware of the graphics processor may be modified for use with the methods described herein. For example, a size of a pre-existing buffer for storing the weight data may be increased, for example by around 10%, to enable storage of the weight data.

Figure 4:
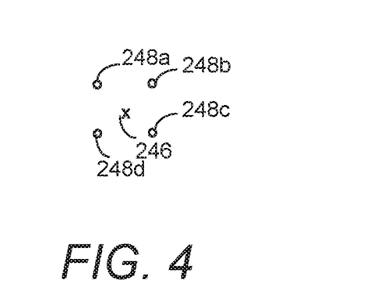
FIG. 4 illustrates schematically the calculation of a value at a position in a texture space according to examples.

A schematic example of the interpolation process is illustrated in FIG. 4. FIG. 4 shows the calculation of a value at a position 246 in texture space which does not correspond with a texel position. Thus, the position 246 is for example located at a non-integer coordinate in the texture space, where texels may generally be represented by integer coordinates in the texture space. In FIG. 4, the texture data represents four texels 248*a*, 248*b*, 248*c*, 248*d* that correspond to an area in the texture space that includes the position 246. For example, the area may be considered to be a two dimensional region surrounded or bounded by a perimeter of a region formed by a combination of the plurality of texels (in this case, the four texels 248*a*, 248*b*, 248*c*, 248*d*). The texture data representative of the plurality of texels 248*a*, 248*b*, 248*c*, 248*d* can for example be obtained from the first storage 238 of the graphics processor 228 based on the position data, for example by fetching texture data corresponding to the plurality of texels 248*a*, 248*b*, 248*c*, 248*d* with positions, for example coordinates, that are the same as or within a fixed or predetermined range to an integer part of the coordinates of the position 246. Referring to the simple example above, in which the position 246 has the coordinates (0.5, 0.5), the first, second, third and fourth texels 248*a*, 248*b*, 248*c*, 248*d* have the coordinates (0, 0), (1, 0), (0, 1) and (1, 1) respectively, the integer part of the coordinates of the position 246 may be taken as (0, 0). In this case, the plurality of texels may be taken as those four texels that are within 0 and 1 units of the integer part of the coordinates of the position 246, i.e. (0, 0), (1, 0), (0, 1) and (1, 1). As the skilled person will appreciate though, the texture data representative of the plurality of texels 248*a*, 248*b*, 248*c*, 248*d* may be fetched using other methods in other examples. The plurality of texels may include any number of texels and may therefore occupy any size of area in the texel space. Typically, though, the plurality of texels is four texels, in a two texel by two texel block.

Using the texture data representative of the plurality of texels, an interpolation can be performed to calculate a value for the position. The value for the position may then be mapped appropriately to a pixel for display by a display device.

The interpolation process takes as an input the weight data, which is representative of weights. The weights for example have a one-to-one mapping with a corresponding texel represented by the texture data. For example, each texel may have a corresponding weight. In other examples, though, there may be a one-to-many or many-to-one mapping between the weights and the texels. The interpolation process may be any suitable interpolation process, which may be referred to as a filtering process, such as bilinear interpolation, bicubic interpolation, bilateral filtering, Lanczos filtering or Sin c filtering.

As an example, the weights may be independent of the position in the texture space. For example, where the interpolation process is a downscaling, each of the four weights may be equal to 0.25. Thus, the weights may be represented by a vector or array w:

$$w=(0.25, 0.25, 0.25, 0.25)$$

In this case, the weights may be pre-calculated by the fragment shader 216, for example using the shader core of the graphics processor, which is for example a shader processing unit, and transferred to the texture mapping unit 218 with the request data 230 as described above, rather than being calculated by the texture mapping unit 218.

In other examples, though, the weights may not be a constant. For example, the weights may depend on parameters or characteristics of a pixel corresponding to a position at which the value is to be calculated by the interpolation process. For example, the weights may depend on a depth value of the pixel corresponding to the position at which the value is to be calculated or a function of the depth value of the pixel such as a function of the depth difference between a high resolution depth value of the pixel and a low resolution depth value of the pixel (for example based on the depth data stored in the Z-buffer). This may be the case for example where the interpolation process involves bilateral upscaling. Alternatively, the weights may be based on a formula, such as a trigonometric formula (as is the case for Lanczos and Sin c filtering).

Regardless of how the weights are calculated, in examples each of the four texels 248*a*, 248*b*, 248*c*, 248*d* may be multiplied or weighted by a corresponding element of the array w, and then the weighted texel values may be added or summed together to calculate the value at the position. For example, where the texel values for a top left, top right, bottom left and bottom right texel are represented as $T_1$, $T_2$, $T_3$, $T_4$ respectively) and the weight array is represented as:

$$w=(w_1, w_2, w_3, w_4)$$

the output texel value, $T_{OUT}$, at the position in the texel space may be calculated as:

$$T_{OUT}=T_1 w_1 + T_2 w_2 + T_3 w_3 + T_4 w_4$$

As explained above, passing the weight data to the texture mapping unit with the request data allows the weight data to be pre-calculated rather than calculated by the texture mapping unit itself. This provides more flexibility as different weights, for example to implement different interpolation algorithms, can be passed to the texture mapping unit without having to reconfigure the texture mapping unit. This allows the texture mapping unit to be used for a variety of different interpolation algorithms, without needing to include different hardware support for each of the different algorithms.

In this example, the weight data is representative of a plurality of weight values with a sum of the plurality of weight values being equal to one. However, in other examples, the texture filtering unit 244 may be configured to accept weight values that do not satisfy this condition. For example, a sum of the plurality of weight values may be smaller than zero or larger than one, or the sum of the plurality of weight values may be between zero and one or equal to zero. This provides further flexibility to the interpolation processes that may be performed by the texture filtering unit 244.

Similarly, although in this example the weight data is representative of a positive number, in other examples the weight data may be representative of at least one weight with a negative value.

The weight data may be in what may be considered to be a medium precision format, such as the fp16 format (sometimes referred to as a half-precision floating-point format). This for example allows the texture mapping process to be performed sufficiently quickly but without suffering from a reduced quality of display output. In other examples, though, the weight data may be in a higher precision format, such as the fp32 format (sometimes referred to as a single-precision floating-point format). In yet further examples, the weight data may be an integer. For example, the weight may be in a signed integer format or an unsigned integer format, for example in an 8-bit signed or unsigned integer format.

Figure 5:
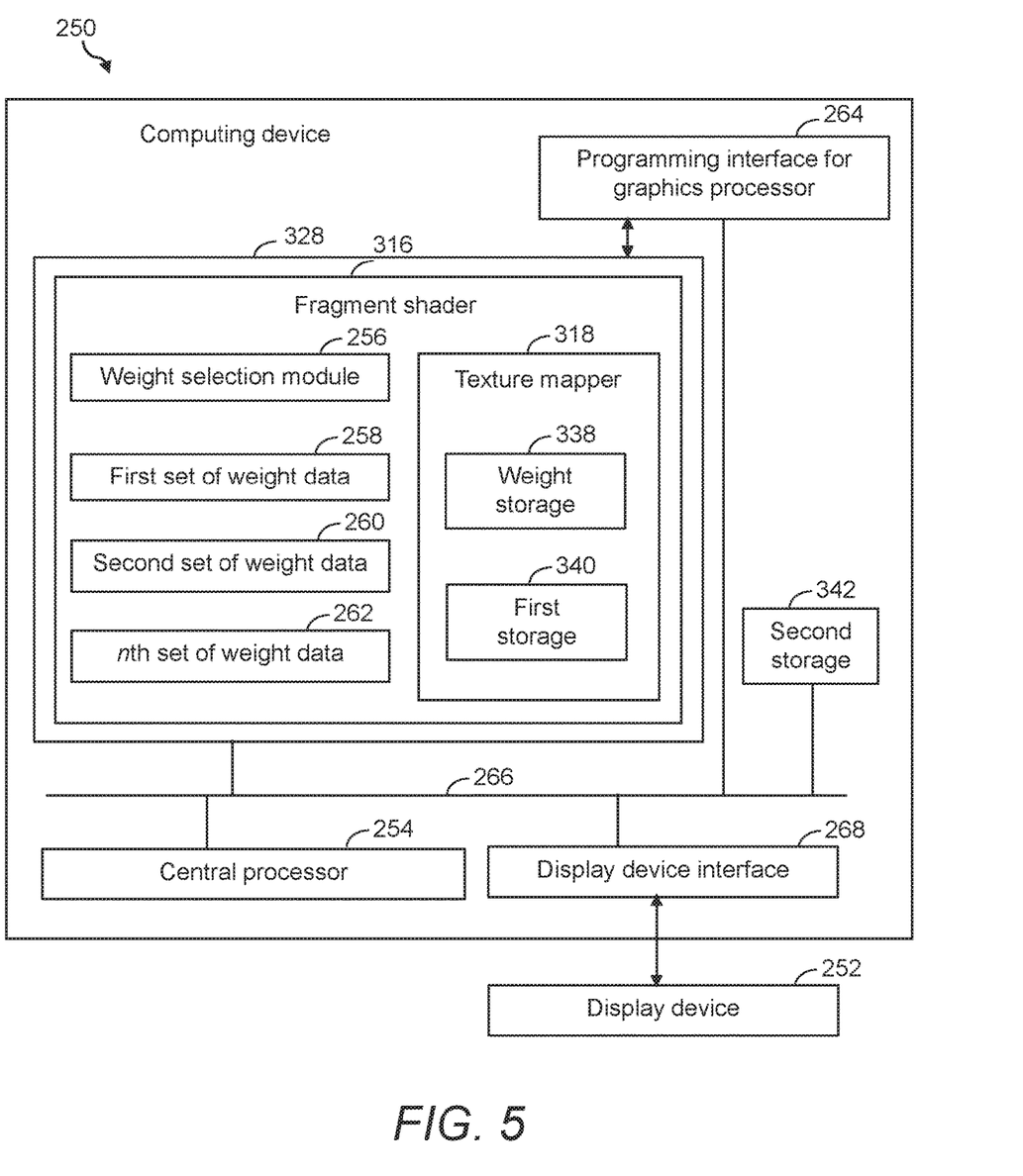
FIG. 5 is a schematic diagram showing internal components of a computing device according to examples.

A schematic diagram of internal components of a computing device 300 for use with the graphics processing pipelines described above with reference to FIGS. 1 to 4 is illustrated in FIG. 5. Features of FIG. 5 that are the same as corresponding features of the previous FIGS. are labelled with the same reference numerals; corresponding descriptions are to be taken to apply.

The computing device 250 is for example any electronic device with suitable processing capabilities to implement the graphics processing pipeline described herein. The computing device 250 may be or include, amongst others, a cell phone, i.e. a mobile phone, for example a smartphone, a tablet, laptop or personal computer, a personal digital assistant, as well as various other electronic devices such as a game console.

In the example of FIG. 5, the computing device 250 is coupled to a display device 252, for displaying the image resulting from the graphics processing pipeline. The display device 252 may be internally coupled to the computing device 250, with the display device 252 forming part of the computing device 250 itself. For example, the display device 252 may be a display screen of a computing device 250 such as a smartphone; tablet, laptop or desktop computer; or personal digital assistant. Alternatively, the display device 252 may be an external device coupled to the computing device 250, for example a television screen or a computer monitor coupled to a laptop, desktop computer or game console via a High-Definition Multimedia Interface (HDMI) cable. The display device 250 may be any suitable display device such as a transmissive or transflective display device such as liquid crystal display (LCD) device, an electrowetting display device or an electrophoretic display device. Alternatively, the display device may be a display device in which pixels or picture elements of the display device generate light, such as an organic light emitting diode (OLED) display device or a plasma display device.

The computing device 250 includes a graphics processor 328 and a second storage 342, which may be similar to or the same as the graphics processor 228 and the second storage 242 described with reference to FIG. 3. A central processor 254 is communicatively coupled to the second storage 242 in the computing device 250 of FIG. 5, which in this example is a main memory of the computing device 250. The computing device 250 may also include at least one further processor (not illustrated). The central processor 250 in the example of FIG. 5 may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

Some components of the graphics processor 328 of FIG. 5 are omitted, for clarity. Nevertheless, a fragment shader 316 and a texture mapping unit 318 of the graphics processor 328 of FIG. 5 may be similar to or the same as the fragment shader 216 and the texture mapping unit 218 described with reference to FIG. 3. In this example, however, the fragment shader 316 includes a weight selection module 256 operable to select the weight data from a plurality of sets of weight data, in this example a first set of weight data 258, a second set of weight data 260 and an nth set of weight data 262. The plurality of sets of weight data may be stored by storage of or accessible to the graphics processor 328, for example in a lookup table. In this example, the weight selection module 256 is represented by weight selection computer program code associated with a programming interface 264 for the graphics processor 328. The programming interface 264 may be used, for example by an application, such as application 102 described above with reference to FIG. 2, to provide shader programs to be executed as part of the graphics processing pipeline, such as a texture mapping program, using a high-level shader programming language, such as OpenGL® Shading Language (GLSL), High-level Shading Language (HLSL), Open Computing Language (OpenCL), etc. For example, the application 102 may instruct the graphics processor 328 to implement the weight selection module 256 as part of the graphics processing pipeline, via the programming interface 264. The weight selection computer program code is therefore operable to instruct the graphics processor 328 to implement the weight selection module 256 when processed by the graphics processor 328. In other words, in this example, the weight selection module 256 is implemented in software. The weight selection module 256 of FIG. 5 is a software routine associated with the fragment shader. Thus, in this example, the weight selection computer program code is executed by a graphics processor shader core, which may be referred to herein as a shader processing unit, of the graphics processor 328. The graphics processor shader core is for example hardware of the graphics processor 328 for executing stages of the graphics processing pipeline relating to shading, such as the fragment shader 316 stage. Thus, in FIG. 5, the shader processing unit is a processor or processors for executing the instructions to implement the fragment shader 316. The weight selection computer program code may be executed by or as part of the arithmetic unit of the fragment shader 316 (not shown in FIG. 5), which may in turn be executed by or using the shader processing unit. In other examples, though, the weight selection module may be implemented in hardware or a combination of hardware and software. For example, a shader processing unit of the graphics processor 328 may be configured to implement the weight selection module 256 in hardware, without being configured or otherwise instructed via software.

The weight selection module 256 may be operable to select the weight data based on an input, which may for example be set to a default or predetermined value to select a default set of weight data or which may be altered. For example, a user or a developer configuring the graphics processing pipeline for a particular purpose or for use with a particular application may select the weight data to be used, by appropriately configuring the weight selection module 256 to select the desired weight data. The selected weight data may then be transferred to the texture mapper 318 as part of the texturing request message (for example via the request data), and stored in the weight storage 338 of the graphics processor 328, for example in a weights buffer of a texture mapping unit 318 of the graphics processor 328.

In this and other examples, the graphics processing system may include graphics computer program code associated with the programming interface 264, the graphics computer program code operable to instruct the graphics processor 328 to perform the interpolation process based on the request data including the weight data, via the programming interface 264. The graphics computer program code may therefore include texture mapping computer program code operable to receive, as an input, the texture data, position data representative of the position in the texture space, and the weight data, the texture mapping computer program code operable to instruct the graphics processor 328 to perform the interpolation process, via the programming interface 264.

As an illustrative example, pseudo-code representative of the texture mapping computer program code may be set out as:

```
vec4result=TEX_WEIGHTS(texture,sampler,tex_co-
    ord,weights)
``` where "result" is the output of the interpolation process, "TEX_WEIGHTS" represents the instruction to the graphics processor 328 to perform the interpolation process using the weights, "texture" indicates the texture that is to be interpolated, "sampler" indicates how the texture is to be interpolated and for example provides various parameters to be used as part of the texture mapping process such as whether the coordinates are normalized, how edges are to be handled and so forth, "tex_coord" indicates where in the texture to sample, and "weights" represents the weight data that is provided as part of the request data.

Thus, solely one instruction (the "TEX_WEIGHTS" instruction) is needed to perform the interpolation process in examples such as this. These examples may therefore be more efficient than other examples in which four instructions are required to fetch the four texels for the interpolation (e.g. from storage of the graphics processor to a main memory) and four arithmetic instructions are needed to perform the interpolation based on the four texels.

In order to instruct the graphics processor 328 in this way, the graphics computer program code may be translated by a shader language compiler to binary code for the target graphics processing pipeline, for example for execution by the graphics processor 328, for example by the shader core of the graphics processor 328. This may include creating one or more internal, intermediate representations of the program within the compiler. The compiler may, for example, be part of the driver 108 (which may for example be the same as or part of the programming interface 264 shown in FIG. 5), with there being a special API call to cause the compiler to run. The compiler execution can thus be seen as being part of the draw call preparation done by the driver in response to API calls generated by the application 102. For example, the graphics computer program code may be compiled at run-time.

In examples, the graphics computer program code may directly or explicitly instruct the graphics processor 328 to use the TEX_WEIGHTS instruction. However, in other examples, the graphics computer program code may not explicitly instruct the graphics processor 328 to use the TEX_WEIGHTS instruction. Instead, the compiler may be configured to select from the TEX_WEIGHTS instruction or another instruction or sequence of instructions for performing the interpolation process (for example, an instruction in which the weight data is calculated by the texture mapping unit 318 rather than by the fragment shader 316) during compilation of the graphics computer program code. In these cases, the compiler may select the TEX_WEIGHTS instruction for example where the weight calculation can be performed as part of the fragment shader 316 stage, for example where the weight data is independent of the texture sampling position, where the texture sampling position for example corresponds to a position in the texture space at which the value is to be interpolated.

The components of the computing device 250 in the example of FIG. 5 are interconnected using a systems bus 266. This allows data to be transferred between the various components. For example, the output of the texture mapping unit 318 may be stored initially in the first storage 340 of the graphics processor 328 or in a different storage of the graphics processor 328 and subsequently transmitted via the systems bus 266 from the first storage 340 to a display device interface 268 for transfer to the display device 252 for display. The display device interface 268 may include a display port and/or an internal electronics interface, e.g. where the display device 252 is part of the computing device 250 such as a display screen of a smartphone. Therefore, when instructed by a processor of the computing device 250, such as the central processor 254, via the display device interface 268, the display device 252 will display a rendered image.

Although not shown in FIG. 5, the computing device 250 of FIG. 5 may also include a network interface for receiving data, such as image data, from a server device. The network interface of the computing device 250 may include software and/or hardware components, such as a virtual network interface, an Ethernet port, a software driver and/or communications stack interacting with network hardware.

Figure 6:
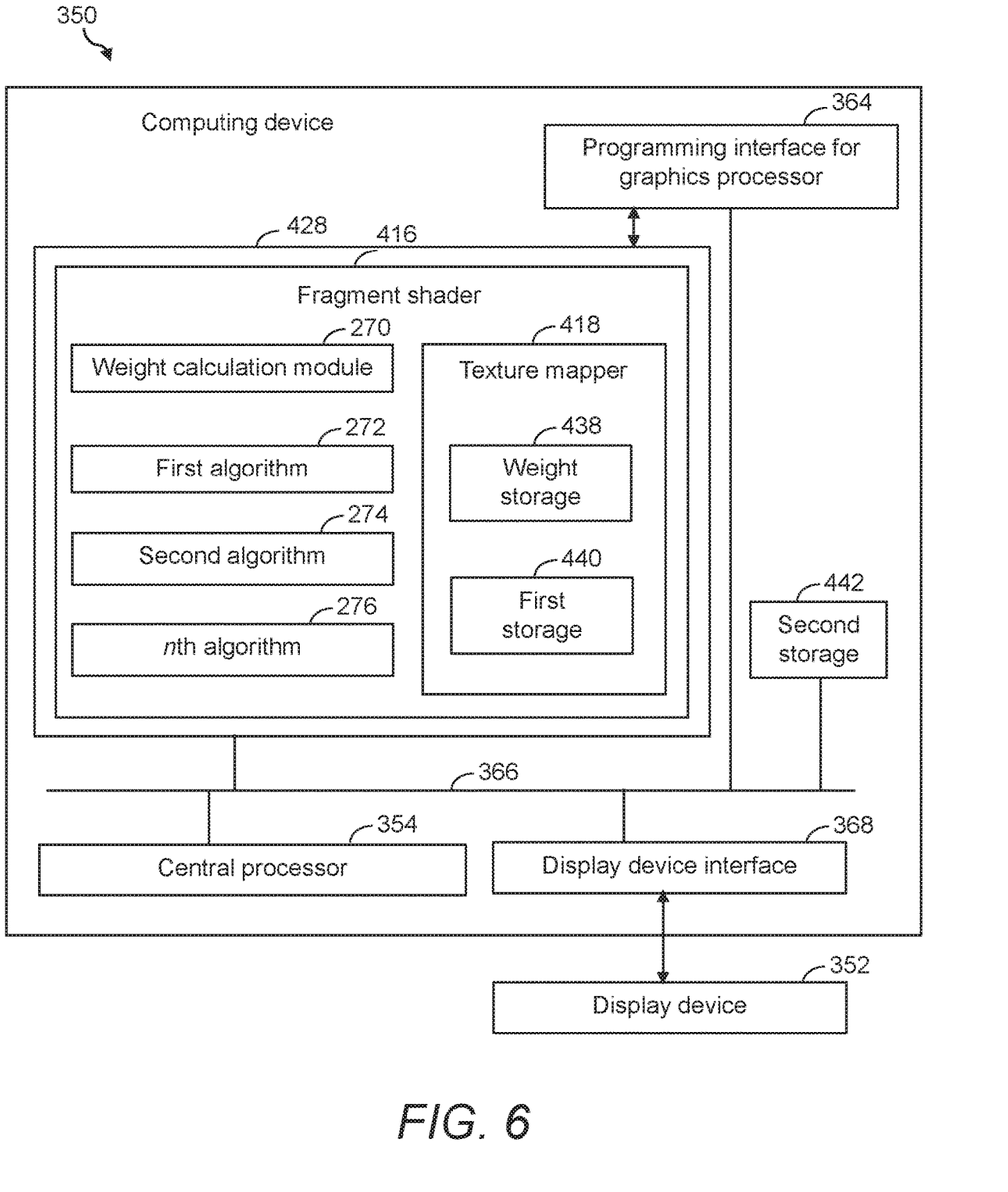
FIG. 6 is a schematic diagram showing internal components of a computing device according to further examples.

A schematic diagram of internal components of a further example computing device 350 for use with the graphics processing pipelines described above with reference to FIGS. 1 to 4 is illustrated in FIG. 6. Features of FIG. 6 that are similar to corresponding features of FIG. 5 are labelled with the same reference numerals but incremented by 100; corresponding descriptions are to be taken to apply.

The computing device 350 of FIG. 6 is similar to the computing device 250 of FIG. 5 but includes a weight calculation module 270 operable to calculate the weight data based on a predetermined algorithm. Similarly to the weight selection module 256 of FIG. 5, there may be weight calculation program code associated with the programming interface 364 for the graphics processor 428. The weight calculation computer program code is operable to instruct the graphics processor 428 to implement the weight calculation module 270. Thus, in this example, the weight calculation module 270 is implemented in software. For example, as for the weight selection module 256, the weight calculation module 270 may be implemented in software, for example as software executed by the graphics processor shader core, which may be referred to herein as a shader processing unit, for example as part of the fragment shader 416 stage. For example, the weight calculation computer program code may be executed by or as part of the arithmetic unit of the fragment shader 416 (not shown in FIG. 6), which may in turn be executed by or using the shader processing unit. In other examples, though, the weight calculation module 270 may be implemented by a different component or unit of the graphics processor 428 or may be implemented in hardware or a combination of hardware and software. For example, a shader processing unit of the graphics processor 428 may be configured to implement the weight selection module 256 in hardware, without being configured or otherwise instructed via software.

The predetermined algorithm may be selected from a plurality of different algorithms. This is shown schematically in FIG. 6, in which the fragment shader 416 includes a first algorithm 272, a second algorithm 274 and an nth algorithm 276 for selection by the weight calculation module 270. The output of the weight calculation module 270 is the weight data, which is for example received by the graphics processor 428, via the systems bus 366, as part of the request data, and stored in the weight storage 438 of the texture mapper 418 of the graphics processor 428. The computing device 350 of FIG. 6 also includes a first storage 440 and a second storage 442.

As described above for the weight selection module 256 of FIG. 5, the predetermined algorithm may be configured by a user or developer of the graphics processing pipeline or selected in dependence on an intended use of the graphics processing pipeline.

The weight calculation module 270 is for example operable to determine that a weight value represented by the weight data is outside a predetermined range and process the weight data to set the weight value to a minimum or a maximum of the predetermined range. For example, if the predetermined range is −2 to +2 but a calculated weight is +2.5, the calculated weight may be adjusted to be +2 (the maximum of the predetermined range). In such cases, the weight value may be set to the minimum or the maximum of the predetermined range depending on which of the minimum or the maximum is closest to the weight value. Thus, weight values lower than the minimum will be set to the minimum and weight values higher than the maximum will be set to the maximum.

Figure 7:
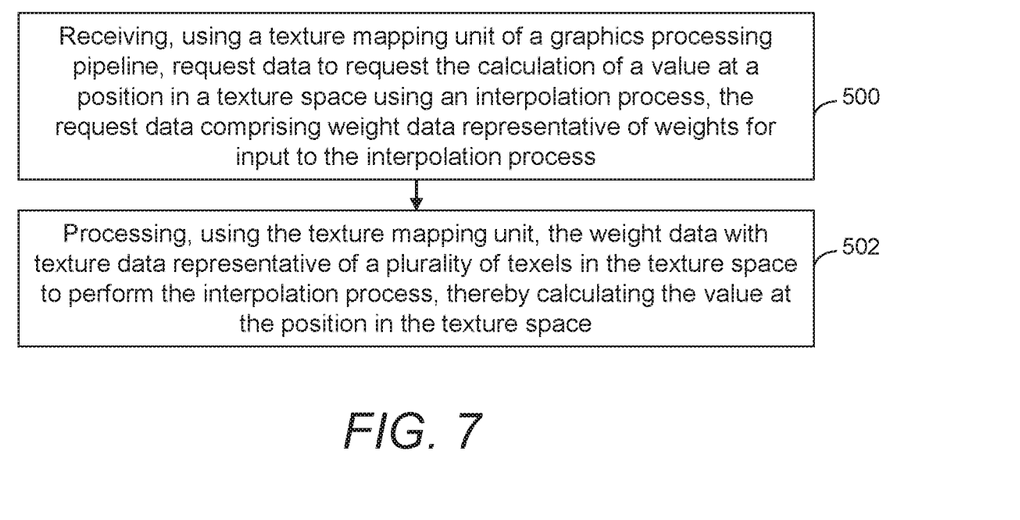
FIG. 7 is a flow diagram illustrating a method of texture mapping for a graphics processing pipeline according to examples.

FIG. 7 is a flow diagram illustrating a method of texture mapping for a graphics processing pipeline according to examples. The method of FIG. 7 involves, at block 500, receiving, using a texture mapping unit of the graphics processing pipeline, request data to request the calculation of a value at a position in a texture space using an interpolation process, the request data including weight data representative of weights for input to the interpolation process. The method of FIG. 7 further includes, at block 502, processing, using the texture mapping unit, the weight data with texture data representative of a plurality of texels in the texture space to perform the interpolation process, thereby calculating the value at the position in the texture space. The method of FIG. 7 may be implemented using any of the graphics processing pipelines or systems described herein.

In further examples, the method of FIG. 7 may include, before the receiving the request data, selecting the weight data from a plurality of sets of weight data. For example, the weight data may be selected using a weight selection module such as that described with reference to FIG. 5. Additionally, the method of FIG. 7 may include calculating a first set of the plurality of sets of weight data using a first algorithm and calculating a second set of the plurality of sets of weight data using a second algorithm different from the first algorithm. The first and second sets of the plurality of sets of weight data may for example be calculated using a weight calculation module such as the described above with reference to FIG. 6.

The above examples are to be understood as illustrative examples of the invention. Further examples are envisaged. In the example of FIG. 3, the texture mapper 218 includes the weight storage 238 and the first storage 240. However, in further examples, one or both of the weight storage 238 and the first storage 240 may be located within a different component or unit of the graphics processor 228, or the weight storage 238 and the first storage 240 may be integrated or form part of the same storage system.

In the examples above, references to receiving data as an input to computer program code are also envisaged to include receiving a pointer or reference to the data or an input that allows the data to be located within memory as the input. As the skilled person will appreciate, a pointer for example refers or "points" to a particular location or address in storage at which the data is stored. Thus, the data can be obtained from the correct address in the storage based on the pointer. For example, the texture mapping computer program code may receive a texture descriptor pointer as an input rather than a pointer to the texture data or the texture data itself. As described herein, though, this is to be considered analogous or equivalent to receiving the texture data itself as an input to the texture mapping computer program. Similarly, one or both of the respective pointers to the position data and the weight data may be received as an input to the texture mapping computer program code; this is to be considered analogous or equivalent to the texture mapping computer program code receiving the position data and the weight data directly. In other words, receiving data as an input is to be interpreted herein as also encompassing receiving a pointer or reference to the data.

It should be noted that the FIGS. are merely schematic, and that, for example, in practice illustrated functional units in the same FIG. may share significant hardware circuits, even though they may be shown schematically as separate units. It will also be appreciated that each of the stages, elements and units, etc., of the FIGS. may be implemented as desired and will accordingly include, for example, appropriate circuitry and/or processing logic, etc., for performing the associated operation and functions.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A graphics processing system comprising:
   a first storage for storing:
      first texture data representative of a first plurality of texels in a texture space; and
      second texture data representative of a second plurality of texels in the texture space;
   a second storage; and
   a graphics processor coupled to the storage, the graphics processor comprising:
      a texture mapping unit operable to:
         receive first request data to request the calculation of a first value at a first position in the texture space using an interpolation process, the first request data comprising first weight data representative of first weights for input to the interpolation process,
      the texture mapping unit comprising a data fetching unit operable to:
         determine that a portion of the first texture data representative of at least one of the first plurality of texels is absent from the first storage;
         fetch the portion of the first texture data from the second storage; and
         store the portion of the first texture data in the first storage, the texture mapping unit operable to, while the portion of the first texture data is being fetched from the second storage:
  receive second request data to request the calculation of a second value at a second position in the texture space using the interpolation process, the second request data comprising second weight data representative of second weights for input to the interpolation process; and
  process the second weight data with the second texture data to perform the interpolation process, thereby calculating the second value at the second position in the texture space; and
the texture mapping unit operable to, after the portion of the first texture data is stored in the first storage, process the first weight data with the first texture data to perform the interpolation process, thereby calculating the first value at the first position in the texture space.

2. The graphics processing system according to claim 1, comprising a weight selection module operable to select the first weight data from a plurality of sets of weight data.

3. The graphics processing system according to claim 2, comprising:
a programming interface for the graphics processor; and
weight selection computer program code associated with the programming interface, the weight selection computer program code operable to instruct the graphics processor to implement the weight selection module.

4. The graphics processing system according to claim 1, comprising a weight calculation module operable to calculate the first weight data based on a predetermined algorithm.

5. The graphics processing system according to claim 4, wherein the predetermined algorithm is selected from a plurality of different algorithms.

6. The graphics processing system according to claim 4, comprising:
a programming interface for the graphics processor; and
weight calculation computer program code associated with the programming interface, the weight calculation computer program code operable to instruct the graphics processor to implement the weight calculation module.

7. The graphics processing system according to claim 4, wherein the weight calculation module is operable to:
determine that a weight value represented by the first weight data is outside a predetermined range; and
process the first weight data to set the weight value to a minimum or a maximum of the predetermined range.

8. The graphics processing system according to claim 1, wherein the first weight data is representative of at least one weight with a negative value.

9. The graphics processing system according to claim 1, wherein the first weight data is representative of a plurality of weight values, a sum of the plurality of weight values being smaller than zero or larger than one.

10. The graphics processing system according to claim 1, wherein the first weight data is independent of the first position in the texture space.

11. The graphics processing system according to claim 1, wherein the first weight data is in fp16, fp32, signed integer, or unsigned integer format.

12. The graphics processing system according to claim 1, wherein the graphics processor comprises a shader processing unit and the shader processing unit is configured to transmit the first request data to the texture mapping unit to instruct the texture mapping unit to perform the interpolation process.

13. The graphics processing system according to claim 1, wherein the first request data comprises first position data representative of the first position in the texture space.

14. The graphics processing system according to claim 1, wherein the first plurality of texels correspond to an area in the texture space, the area comprising the first position.

15. The graphics processing system according to claim 1, wherein the first storage is local storage of the graphics processor and the second storage is external to the graphics processor.

16. The graphics processing system according to claim 1, wherein the texture mapping unit is operable to receive, in a single instruction, the first request data comprising the first weight data, and to process the first weight data with the first texture data to perform the interpolation process in response to receiving the single instruction.

17. The graphics processing system according to claim 1, wherein the texture mapping unit comprises the first storage.

18. A method of texture mapping for a graphics processing pipeline, the method comprising:
receiving, using a texture mapping unit of the graphics processing pipeline, first request data to request the calculation of a first value at a first position in a texture space using an interpolation process, the first request data comprising first weight data representative of first weights for input to the interpolation process;
determining that a portion of the first texture data representative of at least one of a first plurality of texels in the texture space is absent from a first storage of a graphics processing system comprising the texture mapping unit;
fetching the portion of the first texture data from a second storage of the graphics processing system;
storing the portion of the first texture data in the first storage;
while the portion of the first texture data is being fetched from the second storage:
  receiving, using the texture mapping unit, second request data to request the calculation of a second value at a second position in the texture space using the interpolation process, the second request data comprising second weight data representative of second weights for input to the interpolation process; and
  processing, using the texture mapping unit, the second weight data with second texture data representative of at least one of a second plurality of texels in the texture space to perform the interpolation process, thereby calculating the second value at the second position in the texture space; and
after the portion of the first texture data is stored in the first storage, processing, using the texture mapping unit, the first weight data with the first texture data to perform the interpolation process, thereby calculating the first value at the first position in the texture space.

19. The method according to claim 18, comprising, before the receiving the first request data, selecting the first weight data from a plurality of sets of weight data.

20. The method according to claim 19, comprising:
calculating a first set of the plurality of sets of weight data using a first algorithm; and calculating a second set of the plurality of sets of weight data using a second algorithm, different from the first algorithm.

\* \* \* \* \*